(12) United States Patent
Sita et al.

(10) Patent No.: US 9,175,103 B2
(45) Date of Patent: Nov. 3, 2015

(54) LIVING COORDINATIVE CHAIN TRANSFER POLYMERIZATION WITH DYNAMIC COUNTERION EXCHANGE

(75) Inventors: Lawrence R. Sita, Silver Spring, MD (US); Jia Wei, Beltsville, MD (US); Wei Zhang, Gaithersburg, MD (US)

(73) Assignee: University of Maryland, College Park, College Park, MD (US)

( * ) Notice: Subject to any disclaimer, the term of this patent is extended or adjusted under 35 U.S.C. 154(b) by 124 days.

(21) Appl. No.: 13/703,212

(22) PCT Filed: Jun. 10, 2011

(86) PCT No.: PCT/US2011/040025
§ 371 (c)(1),
(2), (4) Date: Nov. 21, 2013

(87) PCT Pub. No.: WO2011/156742
PCT Pub. Date: Jan. 5, 2011

(65) Prior Publication Data
US 2014/0073752 A1 Mar. 13, 2014

Related U.S. Application Data

(60) Provisional application No. 61/353,449, filed on Jun. 10, 2010.

(51) Int. Cl.
| | | |
|---|---|---|
| C08F 4/643 | (2006.01) | |
| C08F 4/6592 | (2006.01) | |
| C08F 210/00 | (2006.01) | |
| C08F 210/16 | (2006.01) | |
| C08F 4/659 | (2006.01) | |

(52) U.S. Cl.
CPC ............... *C08F 4/643* (2013.01); *C08F 4/6592* (2013.01); *C08F 210/16* (2013.01); *C08F 4/65908* (2013.01); *C08F 2410/01* (2013.01); *C08F 2420/01* (2013.01); *C08F 2420/02* (2013.01)

(58) Field of Classification Search
CPC ............ C08F 4/64013; C08F 4/65908; C08F 4/6592; C08F 210/00; C08F 210/02; C08F 4/643; C08F 210/16
See application file for complete search history.

(56) References Cited

U.S. PATENT DOCUMENTS

| | | | |
|---|---|---|---|
| 5,447,895 | A | 9/1995 | Marks et al. |
| 7,183,364 | B2 | 2/2007 | Sita |
| 7,541,412 | B2 | 6/2009 | Sita |
| 7,868,088 | B2 | 1/2011 | Sita et al. |
| 8,188,200 | B2 | 5/2012 | Sita et al. |
| 2007/0167578 | A1 | 7/2007 | Arriola et al. |
| 2009/0220786 | A1 | 9/2009 | Sita et al. |
| 2012/0316302 | A1* | 12/2012 | Stewart .................. 526/126 |
| 2013/0109900 | A1 | 5/2013 | Sita et al. |

OTHER PUBLICATIONS

Zhang et al., "Highly Efficient, Living Coordinative Chain-Transfer Polymerization of Propene with ZnEt2: Practical Production of Ultrahigh to Very Low Molecular Weight Amorpous Atactic Polypropenes of Extremely Narrow Polydispersity", J. of American Chemical Society, 2008, 130, 442-443.*

Arriola, D. J., et al., "Catalytic Production of Olefin Block Copolymers via Chain Shuttling Polymerization," *Science* 312:714-719, American Association for the Advancement of Science, United States (2006).

Bazan, G.C., et al., "Catalytic Insertion of Ethylene into Al—C Bonds with Pentamethylcyclopentadienyl—Chromium (III) Complexes," *Organometallics* 20:2059-2064, American Chemical Society, United States (2001).

Bochmann, M., "Cationic Group 4 metallocene complexes and their role in polymerisation catalysis: the chemistry of well defined Ziegler catalysts," *J. Chem. Soc., Dalton Trans*:255-270, The Royal Society of Chemistry, United Kingdom (1996).

Brintzinger, H.H., et al., "Stereospecific Olefin Polymerization with Chiral Metallocene Catalysts," *Angew. Chem. Int. Ed. Engl.* 34:1143-1170, Wiley-VCH, Germany (1995).

Britovsek, G.J.P., et al., "Iron-Catalyzed Polyethylene Chain Growth on Zinc: Linear β-Olefins with a Poisson Distribution," *Angew. Chem. Int. Ed.* 41(3):489-491, Wiley-VCh, Germany (2002).

Britovsek, G.J.P., et al., "Iron Catalyzed Polyethylene Chain Growth on Zinc: A Study of the Factors Delineating Chain Transfer versus Catalyzed Chain Growth in Zinc and Related Metal Alkyl Systems," *J. Am. Chem. Soc.* 126:10701-10712, American Chemical Society, United States (2004).

Carlini, C., et al., "Linear low-density polyethylenes by co-polymerization of ethylene with 1-hexene in the presence of titanium precursors and organoaluminium co-catalysts," *Polymer* 48:1185-1192, Elsevier Ltd., Netherlands (2007).

Chen, Y.-X., et al., "Sterically Encumbered (Perfluoroaryl) Borane and Aluminate Cocatalysts for Tuning Cation—Anion Ion Pair Structure and Reactivity in Metallocene Polymerization Processes. A Synthetic, Structural, and Polymerization Study," *J. Am. Chem. Soc.* 120:6287-6305, American Chemical Society, United States (1998).

Chen, M.-C., and Marks, T.J., "Strong Ion Pairing Effects on Single-Site Olefin Polymerization: Mechanistic Insights in Syndiospecific Propylene Enchainment," *J. Am. Chem. Soc.* 123:11803-11804, American Chemical Society, United States (2001).

Chenal, T., et al., "Controlled polyethylene chain growth on magnesium catalyzed by lanthanidocene: A living transfer polymerization for the synthesis of higher dialkyl-magnesium," *Polymer* 48:1844-1856, Elsevier Ltd., Netherlands (2007).

Cheng, H.N., "Comonomer sequence distribution in ethylene/1-hexene copolymers," *Polymer Bulletin* 26:325-332, Springer-Verlag, Germany (1991).

(Continued)

*Primary Examiner* — Caixia Lu
(74) *Attorney, Agent, or Firm* — Sterne, Kessler, Goldstein & Fox PLLC

(57) ABSTRACT

Disclosed is a method of producing a polyolefin composition comprising contacting a metal alkyl and a first olefin monomer, then adding a first co-catalyst, a second co-catalyst, a pre-catalyst, and a second olefin monomer. The method allows for the production of a series of copolymers with tunable incorporation ratios of the first olefin monomer. The method also allows for the production of polyolefins of low molecular weights and narrow molecular weight distributions.

19 Claims, 5 Drawing Sheets

(56) References Cited

OTHER PUBLICATIONS

Coates, G.W., and Waymouth, R.M., "Oscillating Stereocontrol: A Strategy for the Synthesis of Thermoplastic Elastomeric Polypropylene," *Science* 267:217-219, American Association for the Advancement of Science, United States (1995).

Coates, G.W., et al., "Catalysts for the Living Insertion Polymerization of Alkenes: Access to New Polyolefin Architectures Using Ziegler—Natta Chemistry," *Angew. Chem. Int. Ed.* 41:2236-2257, Wiley-VCH, Germany (2002).

Dankova, M., and Waymouth, R.M., "High Comonomer Selectivity in Ethylene/Hexene Copolymerization by Unbridged Indenyl Metallocenes," *Macromolecules* 36:3815-3820, American Chemical Society, United States (2003).

Domski, G.J., et al., "Polymerization of β-Olefins with Pyridylamidohafnium Catalysts: Living Behavior and Unexpected Isoselectivity from a $C_s$-Symmetric Catalyst Precursor," *Macromolecules* 40:3510-3513, American Chemical Society, United States (2007).

Ganesan, M., and Gabbaï, F.P., "[Cp*Cr($C_6F_5$)(Me)(Py)] as a Living Chromium (III) Catalyst for the "Aufbaureaktion" *Organometallics* 23:4608-4613, American Chemical Society, United States (2004).

Ganesan, M., and Gabbaï, F.P., "Synthesis, structure and catalytic properties of [Cp*Cr($C_6F_5$)(Bn)(THF)] toward ethylene in the presence of $AlEt_3$," *Journal of Organometallic Chemistry* 690:5145-5149, Elsevier B.V., Netherlands (2005).

Harney, M.B., et al., "Discrete, Multiblock Isotactic-Atactic Stereoblock Polypropene Microstructures of Differing Block Architectures through Programmable Stereomodulated Living Ziegler—Natta Polymerization," *Angew. Chem. Int. Ed.* 45:2400-2404, Wiley-VCH, Germany (2006).

Harney, M.B., et al., "Bimolecular Control over Polypropene Stereochemical Microstructure in a Well-Defined Two-State System and a New Fundamental Form: Stereogradient Polypropene," *Angew. Chem. Int. Ed* 45:6140-6144, Wiley-VCH, Germany (2006).

Hlatky, G.G., et al., "Ionic, Base-Free Zirconocene Catalysts for Ethylene Polymerization," *J. Am. Chem. Soc.* 111:2728-2729, American Chemical Society, United States (1989).

Huang, J., et al., "Syntheses of Titanium (IV) Complexes with Mono-Cp and Schiff Base Ligands and Their Catalytic Activities for Ethylene Polymerization and Ethylene/1-Hexene Copolymerization," *Macromolecules* 35:4871-4874, American Chemical Society, United States (2002).

Hustad, P.D., et al., "Continuous Production of Ethylene-Based Diblock Copolymers Using Coordinative Chain Transfer Polymerization," *Macromolecules* 40(20):7061-7064, American Chemical Society, United States (2007).

Itagaki, K., et al., Ethylene polymerization and ethylene/1-octene copolymerization using group 4 half-metallocenes containing aryloxo ligands, Cp*$MCl_2$(OAr)[M=Ti, Zr, Hf; Ar=O-2, 6-$R_2C_6H_3$, R=$^t$Bu, Ph]—MAO catalyst systems,*Journal of Molecular Catalysis A: Chemical* 303:102-109, Elsevier B.V., Netherlands (2009).

Jayaratne, K.C., and Sita, L.R., "Stereospecific Living Ziegler—Natta Polymerization of 1-Hexene," *J. Am. Chem. Soc.* 122:958-959, American Chemical Society, United States (2000).

Jayaratne, K.C., et al., "Living Ziegler—Natta Cyclopolymerization of Nonconjugated Dienes: New Classes of Microphase-Separated Polyolefin Block Copolymers via a Tandem Polymerization/Cyclopolymerization Strategy," *J. Am. Chem. Soc.* 122:10490-10491, American Chemical Society, United States (2000).

Kaminsky, W., and Arndt, M., "Metallocenes for Polymer Catalysis," *Advances in Polymer Science* 127:144-187, Springer-Verlag, Germany (1997).

Keaton, R.J., et al., "Structural Characterization of Zirconium Cations Derived from a Living Ziegler—Natta Polymerization System: New Insights Regarding Propagation and Termination Pathways for Homogeneous Catalysts,"*J. Am. Chem. Soc.* 122:12909-12910, American Chemical Society, United States (2000).

Keaton, R.J., et al., "Dramatic Enhancement of Activities for Living Ziegler—Natta Polymerizations Mediated by "Exposed" Zirconium Acetamidinate Initiators: The Isospecific Living Polymerization of Vinylcyclohexane," *J. Am. Chem. Soc.* 123:6197-6198, American Chemical Society, United States (2001).

Kempe, R., "How to Polymerize Ethylene in a Highly Controlled Fashion?" *Chem. Eur. J.* 13:2764-2773, Wiley-VCH, Germany (2007).

Kretschmer, W.P., et al., "Reversible Chain Transfer between Organoyttrium Cations and Aluminum: Synthesis of Aluminum-Terminated Polyethylene with Extremely Narrow Molecular-Weight Distribution," *Chem. Eur. J.* 12:8969-8978, Wiley-VCH, Germany (2006).

Li, L., et al., "Catalyst/Cocatalyst Nuclearity Effects in Single-Site Polymerization Enhanced Polyethylene Branching and β-Olefin Comonomer Enchainment in Polymerizations Mediated by Binuclear Catalysts and Cocatalysts via a New Enchainment Pathway," *J. Am. Chem. Soc.* 124:12725-12741, American Chemical Society, United States (2002).

Lin, S., and Waymouth, R.M., "2-Arylindene Metallocenes: Conformationally Dynamic Catalysts to Control the Structure and Properties of Polypropylenes," *Acc. Chem. Res.* 35(9):765-773, American Chemical Society, United States (2002).

Marks, T.J., "Surface-Bound Metal Hydrocarbyls. Organometallic Connections between Heterogeneous and Homogeneous Catalysis," *Acc. Chem. Res.* 25(2):57-65, American Chemical Society, United States (1992).

Matyjaszewski, K., "Introduction to Living Polymerization. Living and/or Controlled Polymerization," *Journal of Physical Organic Chemistry* 8:197-207, John Wiley & Sons, Ltd., United States (1995).

Möhring, P.C., and Coville, N.J., "Homogeneous Group 4 metallocene Ziegler—Natta catalysts: the influence of cyclopentadienyl-ring substituents," *Journal of Organometallic Chemistry* 479:1-29, Elsevier Science S.A., Netherlands (1994).

Müller, A.H.E., et al., "Kinetic Analysis of "Living" Polymerization Processes Exhibiting Slow Equilibria. 2. Molecular Weight Distribution for Degenerative Transfer (Direct Activity Exchange between Active and "Dormant" Species) at Constant Monomer Concentration," *Macromolecules* 28:7335-7338, American Chemical Society, United States (1995).

Nomura, K., et al., "Polymerization of 1-hexene, 1-octene catalyzed by Cp'$TiCl_2$(O-2,6-$^i Pr_2C_6H_3$)—MAO system. Unexpected increase of the catalytic activity for ethylene/1-hexene copolymerization by (1,3-$^t Bu_2C_5H_3$)$TiCl_2$(O-2,6-$^i Pr_2C_6H_3$)—MAO catalyst system," *Journal of Molecular Catalysis A: Chemical* 152:249-252, Elsevier Science B.V., Netherlands (2000).

Nomura, K., et al., "Ligand effect in olefin polymerization catalyzed by (cyclopentadienyl) (aryloxy) titanium(IV) complexes, Cp'$TiCl_2$(OAr)—MAO system. Ethylene/1-hexene copolymerization by (1,3-$^t Bu_2C_5H_3$) $TiCl_2$(O-2,6-$^i Pr_2C_6H_3$)—MAO catalyst system," *Journal of Molecular Catalysis A: Chemical* 159:127-137, Elsevier Science B.V., Netherlands (2000).

Pelletier, J.-F., et al., "Synthesis of New Dialkylmagnesium Compounds by Living Transfer Ethylene Oligo- and Polymerization with Lanthanocene Catalysts," *Agnew. Chem. Int. Ed. Engl.* 35(16):1854-1856, Wiley-VCH, Germany (1996).

Quirk, R.P., and Lee, B., "Experimental Criteria for Living Polymerizations," *Polymer International* 27:359-367, Society of Chemical Industry, United Kingdom (1992).

Reybuck, S.E., et al., "Copolymerization Behavior of Unbridged Indenyl Metallocenes: Substituent Effects on the Degree of Comonomer Incorporation," *Macromolecules* 35:637-643, American Chemical Society, United States (2002).

Reybuck, S.E., et al., "Amine Bis(phenolate) Zirconium Complexes: Influence of Ligand Structure and Cocatalyst on Copolymerization Behavior," *Macromolecules* 38:2552-2558, American Chemical Society, United States (2005).

Rogers, J.S., and Bazan, G.C., "Oligomerization-transmetalation reactions of Cp*$CrMe_2(PMe_3)$/methylaluminoxane catalysts," *Chem. Commun.* 1209-1210, The Royal Society of Chemistry, United Kingdom (2000).

(56) References Cited

OTHER PUBLICATIONS

Shan, C.L.P, et al., "Ethylene/1-Octene Copolymerization Studies with In Situ Supported Metallocene Catalysts: Effect of Polymerization Parameters on the Catalyst Activity and Polymer Microstructure," *Journal of Polymer Science: Part A: Polymer Chemistry 40*:4426-4451, Wiley Periodicals, Inc., United States (2002).

Suhm, J. et al., "Temperature Dependence of Copolymerization Parameters in Ethene/1-Octene Copolymerization Using Homogeneous rac-Me$_2$Si(2-MeBenz[e]Ind)$_2$ZrCl$_2$/MAO Catalyst," *Journal of Polymer Science: Part A: Polymer Chemistry 35*:735-740, John Wiley & Sons, Inc., United States (1997).

Van Meurs, M., et al., "Polyethylene Chain Growth on Zinc Catalyzed by Olefin Polymerization Catalysts: A Comparative Investigation of Highly Active Catalyst Systems across the Transition Series," *J Am. Chem. Soc. 127*:9913-9923, American Chemical Society, United States (2005).

Wu, J.-Q., et al., "Ethylene Polymerization and Ethylene/Hexene Copolymerization with Vanadium(III) Catalysts Bearing Heteroatom-Containing Salicylaldiminato Ligands," *Journal of Polymer Science: Part A: Polymer Chemistry 47*:3573-3582, Wiley Periodicals, Inc., United States (2009).

Zhang, Y., and Sita, L.R., "Solid-supported stereospecific living Ziegler—Natta polymerization of β-olefins," *Chem. Commun.* 2358-2359, The Royal Society of Chemistry, United Kingdom (2003).

Zhang, Y., et al., "Goldilocks Effect of a Distal Substituent on Living Ziegler—Natta Polymerization Activity and Stereoselectivity within a Class of Zirconium Amidinate-Based Initiators," *Organometallics 23*:3512-3520, American Chemical Society, United States (2004).

Zhang, W., and Sita, L.R., "Investigation of Dynamic Intra- and Intermolecular Processes within a Tether-Length Dependent Series of Group 4 Bimetallic Initiators for Stereomodulated Degenerative Transfer Living Ziegler—Natta Propene Polymerization," *Adv. Synth. Catal. 350*:439-447, Wiley-VCH, Germany (2008).

International Search Report for International Application No. PCT/US2011/040025, mailed Nov. 30, 2011, U.S. Patent and Trademark Office, Alexandria, VA.

\* cited by examiner

LIVING COORDINATIVE CHAIN TRANSFER POLYMERIZATION WITH DYNAMIC COUNTERION EXCHANGE

Part of the work performed during development of this invention utilized U.S. Government funds. This invention was made with government support under CHE0848293 awarded by the National Science Foundation. The U.S. Government has certain rights in this invention.

BACKGROUND OF THE INVENTION

1. Field of the Invention

The present invention provides a method of producing a polyolefin composition comprising contacting a metal alkyl and a first olefin monomer, then adding a first co-catalyst, a second co-catalyst, a pre-catalyst, and a second olefin monomer. The method allows for the production of a series of copolymers with tunable incorporation ratios of the first olefin monomer. The method also allows for the production of polyolefins of low molecular weights and narrow molecular weight distributions.

2. Related Art

Several transition-metal-based catalysts have been reported that can mediate the living metal-mediated coordination polymerization (also known as homogeneous, single-site Ziegler-Natta polymerization) of ethene, propene, higher α-olefins, and α,ω-nonconjugated dienes, and, in some cases, these proceed with a high degree of stereocontrol (tacticity) ((for a review of catalysts for living coordination polymerization of ethene and α-olefins, see: Coates, G. W., et al., *Angew. Chem. Int. Ed.* 41:2236-2257 (2002)); (for the living and stereoselective coordination polymerization of α-olefins and α,ω-non-conjugated dienes, see: Jayaratne, K. C., et al., *J. Am. Chem. Soc.* 122:958-959 (2000); Jayaratne, K. C., et al., *J. Am. Chem. Soc.* 122:10490-10491 (2000); Keaton, R. J., et al., *J. Am. Chem. Soc.* 123:6197-6198 (2001); Zhang, Y., et al., *Chem. Commun.* 2358-2359 (2003); Zhang, Y., et al., *Organometallics* 23:3512-3520 (2004); Harney, M. B., et al., *Angew. Chem. Int. Ed.* 45:2400-2404 (2006); Harney, M. B., et al., *Angew. Chem. Int. Ed.* 45:6140-6144 (2006); Zhang, W., et al., *Adv. Synth. Catal.* 350:439-447 (2008))). However, the commercialization of new polyolefin materials and products that take advantage of the unique capabilities of living coordination polymerizations appears unlikely (for reviews of polyolefin materials prepared through living coordination polymerization, see: Domski, G. J., et al., *Prog. Polym. Sci.* 32:30-92 (2007); Sakuma, A., et al., *Polym. J.* 39:193-207 (2007); Szwarc, M., et al., *Ionic Polymerization and Living Polymers*; Chapman & Hall: New York (1993); Quirk, R. P., et al., *Polym. Int.* 27:359-367 (1992); Matyjaszewski, K., *J. Phys. Org. Chem.* 8:197-207 (1995)).

The same fundamental criterion of a living polymerization, namely, chain-growth propagation in the absence of irreversible chain termination, serves to establish a "one polymer chain per active metal center" cap on product yield as a critical liability. The severity of this liability sharply increases as the targeted number-average degree of polymerization, $X_n$, of the desired polyolefin product decreases. While living coordination polymerization is ideally suited for accessing the largely unexplored material science and technology associated with architecturally well-structured 'precision polyolefins' of very low to moderate molecular weights (ca 500-10,000 Da), the practical availability of significant quantities of these materials presently remains out of reach due to unfavorable weight (polymer) to weight (catalyst) ratios ((for a review of catalysts for living coordination polymerization of ethene and α-olefins, see Coates, G. W., et al., *Angew. Chem. Int. Ed.* 41:2236-2257 (2002)); (for reviews of polyolefin materials prepared through living coordination polymerization, see Domski, G. J., et al., *Prog. Polym. Sci.* 32:30-92 (2007); Sakuma, A., et al., *Polym. J.* 39:193-207 (2007); Szwarc, M., et al., *Ionic Polymerization and Living Polymers*; Chapman & Hall: New York (1993); Quirk, R. P., et al., *Polym. Int.* 27:359-367 (1992); Matyjaszewski, K., *J. Phys. Org. Chem.* 8:197-207 (1995); Kaneyoshi, H., et al., *Macromolecules* 38:5425-5435 (2005); Ring, J. O., et al., *Macromol. Chem. Phys.* 208:896-902 (2007); Ventolá, L., et al., *J. Phys. Chem. Solids* 66:1668-1674 (2005))).

U.S. Patent Appl. Publication No. 2011/028654 discloses the living coordinative chain-transfer polymerization and copolymerization of ethene, propene, long-chain α-olefins, and α,ω-nonconjugated dienes using $\{\eta^5\text{-}C_5Me_5\}Hf(Me)[N(Et)C(Me)N(Et)]\}[B(C_6F_5)_4]$ as the active transition-metal initiator for chain-growth propagation with multiple stoichiometric equivalents of diethylzinc ($ZnEt_2$) as surrogate chain growth sites. Successful living coordinative chain-transfer polymerization of these monomers requires that the rate, and rate constant for reversible (polymeryl group) chain transfer between the active transition-metal propagating centers, and the inactive surrogate main-group metal species, $v_{ct}$ and $k_{ct}$, respectively, should be far greater than the corresponding kinetic parameters for transition-metal-mediated propagation, $v_p$ and $k_p$, in order to insure that all active and surrogate species appear to propagate at the same rate.

To address the problems inherent with the "one catalyst-one material" strategy, several strategies have been introduced to achieve "one catalyst-many materials" by using dynamic processes competitive to chain propagation. For example, Waymouth and Coates took advantage of conformational flexibility in unconstrained "oscillating" metallocenes to prepare atactic-isotactic stereoblock polypropenes such as elastomers and softened theromoplastics (see Coates, G. W., et al., *Science* 267:217-219 (1995) and Lin, S., et al., *Acc. Chem. Res.* 35:765-773 (2002)). However, no method has been developed to directly modulate chain propagation rates in a single catalyst system.

It is well-known that co-catalyst and the resulting anion play an important role in homogeneous Zeigler-Natta polymerization by stabilizing the cationic transition metal center which is the initiator of olefin polymerization (see Kaminsky, W., et al., *Adv. Polym. Sci.* 127:144-187 (1997); Bohmann, M., *J. Chem. Soc., Dalton Trans.*: 255-270 (1996); Brintzinger, H.-H., et al., *Angew. Chem. Int. Ed* 34:1143-1170 (1995); Guram, A. S., et al., *Comprehensive Organometallic Chemistry II, Chapter* 2; Elsevier: Oxford (1995); Soga, K., et al., *Catalyst Design for Tailor-Made Polyolefins*; Elsevier: Tokyo (1994); Möhring, P. C., et al., *J. Organomet. Chem.* 479:1-29 (1994); Marks, T. J., *Acc. Chem. Res.* 25:57-65 (1992)). Marks and co-workers reported that for olefin copolymerization, tris(2,2',2"-nonafluorobiphenyl)borane (PBB) and tetrakis borate anion $B(C_6H_5)_4^-$ derived cationic complexes exhibited higher catalytic activity and comonomer incorporation level than the $MeB(C_6H_5)_4^-$ analogues (see Chen, Y.-X., et al., *J. Am. Chem. Soc.* 120:6287-6305 (1998); Chen, M. C., et al., *J. Am. Chem. Soc.* 123:11803-11804 (2001); Li, L., et al., *J. Am. Chem. Soc.* 124:12725-12741 (2002)). $MeB(C_6H_5)_4^-$ is a more coordinating anion than bulkier $MePBB^-$ and $B(C_6H_5)_4^-$, and the relatively stronger cation-anion ion pairing stabilizes highly electron-deficient metal centers. Higher hexane incorporation in copolymerization of ethane was observed by Waymouth and co-workers using methylaluminoxane (MMAO) instead of borane catalysts (Reybuck, S. E., et al., *Macromolecules* 38:2552-2558

(2005)). Therefore, the same transition metal pre-catalyst activated by different co-catalysts may show different polymerization characteristics, and having weak ion pairing after activation will yield high propagation rates and high comonomer incorporation level.

There is a need, therefore, for a method that allows for the direct modulation of chain propagation rates in a single catalyst system.

Additionally, there is a need for a method that allows for the production of a series of copolymers with tunable incorporation levels of the first olefin monomer.

BRIEF SUMMARY OF THE INVENTION

The present invention provides a method of producing a polyolefin composition comprising:
(a) contacting a metal alkyl and a first olefin monomer;
(b) adding a pre-catalyst, a first co-catalyst, a second co-catalyst, and a second olefin monomer, wherein the first co-catalyst forms a stronger ion-pair with the pre-catalyst than the second co-catalyst; and
(c) polymerizing by ternary living coordinative chain transfer said first and second monomers for a time sufficient to form said polyolefin.

In one embodiment of the present invention, the metal alkyl is $Zn(R^8)_2$ and $R^8$ is selected from the group consisting of ethyl, methyl, iso-butyl, n-hexyl, n-propyl, and t-butyl. In another embodiment, the metal alkyl is $ZnEt_2$.

In one embodiment of the present invention, the metal alkyl and the first olefin monomer are contacted at a temperature of about 10° C. to about 25° C.

In one embodiment of the present invention, the first olefin monomer is ethene, propene, 1-butene, 1-pentene, 1-hexene, 1-heptene, 1-octene, styrene, butadiene, isoprene, 3-methylbutene, 3-methyl-1-pentene, vinylcyclohexane, vinylcyclobutane, vinylcyclopentane, vinylcyclooctane, 1-decene, enantiomerically pure β-citronellene, 3,5,5-trimethyl-1-hexene, cyclopentene, vinylcyclohexene, or 4-methyl-1-pentene. In another embodiment, the first olefin monomer is ethene.

In one embodiment of the present invention, said metallocene pre-catalyst is $(\eta^5-C_5Me_5)Hf(Me)_2[N(Et)C(Me)N(Et)]$.

In one embodiment of the present invention, the first co-catalyst is $[PhNMe_2H][B(C_6F_5)_4]$.

In one embodiment of the present invention, the second co-catalyst is $[PhNMe_2H][B(C_6F_5)_3Me]$ or $B(C_6F_5)_3$.

In one embodiment of the present invention, the second olefin monomer is ethene, propene, 1-butene, 1-pentene, 1-hexene, 1-heptene, 1-octene, styrene, butadiene, isoprene, 3-methylbutene, 3-methyl-1-pentene, vinylcyclohexane, vinylcyclobutane, vinylcyclopentane, vinylcyclooctane, 1-decene, enantiomerically pure β-citronellene, 3,5,5-trimethyl-1-hexene, cyclopentene, vinylcyclohexene or 4-methyl-1-pentene. In one embodiment, the second olefin monomer is 1-hexene.

In one embodiment of the present invention, the ratio of the first co-catalyst to the second co-catalyst is from about 0.1:1 to about 20:1. In another embodiment, the ratio of the first co-catalyst to the second co-catalyst is from about 1:1 to about 1:7.

In one embodiment of the present invention, the incorporation level of the first olefin monomer is about 1% to about 30%. In another embodiment, the incorporation level of the first olefin monomer is about 2.5% to about 22.6%. In another embodiment, the incorporation level of the first olefin monomer is about 2.5% to about 17%.

In one embodiment of the present invention, the metal alkyl is $ZnEt_2$, the pre-catalyst is $(\eta^5-C_5Me_5)Hf(Me)_2[N(Et)C(Me)N(Et)]$, the first co-catalyst is $[PhNMe_2H][B(C_6F_5)_3Me]$, and the second co-catalyst is $B(C_6F_5)_3$.

In one embodiment of the present invention, the metal alkyl is $ZnEt_2$, the pre-catalyst is $(\eta^5-C_5Me_5)Hf(Me)_2[N(Et)C(Me)N(Et)]$, the first co-catalyst is $[PhNMe_2H][B(C_6F_5)_3Me]$, the second co-catalyst is $B(C_6F_5)_3$, the first olefin monomer is ethene, and the second olefin monomer is 1-hexene.

Another embodiment of the present invention is directed to a method of controlling the level of incorporation of a first olefin monomer into a polyolefin composition comprising:
(a) contacting a first olefin monomer and a metal alkyl;
(b) adding a pre-catalyst, a first co-catalyst, a second co-catalyst, and a second olefin monomer, wherein the first co-catalyst forms a stronger ion-pair with the pre-catalyst than the second co-catalyst; and
(c) polymerizing by ternary living coordinative chain transfer said first and second monomers for a time sufficient to form said polyolefin;
wherein increasing the amount of the second co-catalyst decreases the level of incorporation of the first olefin monomer.

DETAILED DESCRIPTION OF THE INVENTION

Figure 1:
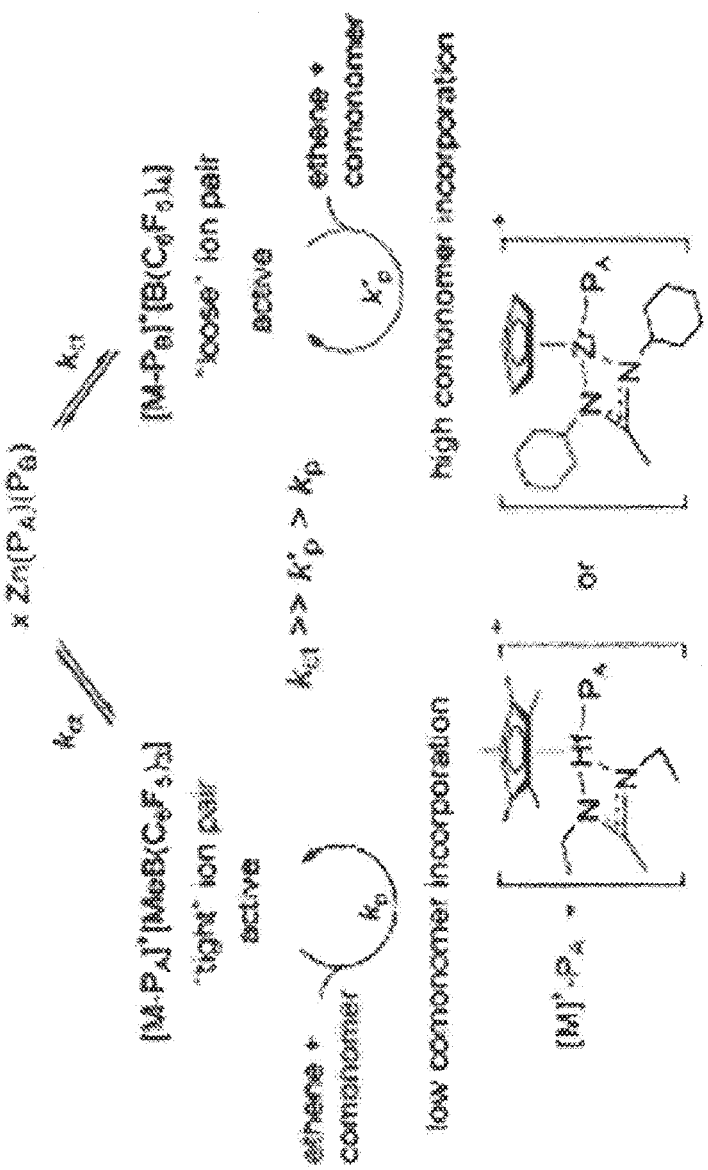
FIG. 1 shows a schematic of the preparation of poly(ethylene-co-1-hexene) with (a) a high level of 1-hexene incorporation using $[Cp^*HfMe\{N(Et)C(Me)N(Et)\}]-[B(C_6F_5)_4]$ as chain propagation center and $ZnEt_2$ as chain transfer reagent and (b) a low level of 1-hexene incorporation using $[Cp^*HfMe\{N(Et)C(Me)N(Et)\}]-[MeB(C_6F_5)_3]$ as chain propagation center and $ZnEt_2$ as chain transfer reagent.
Figure 2:
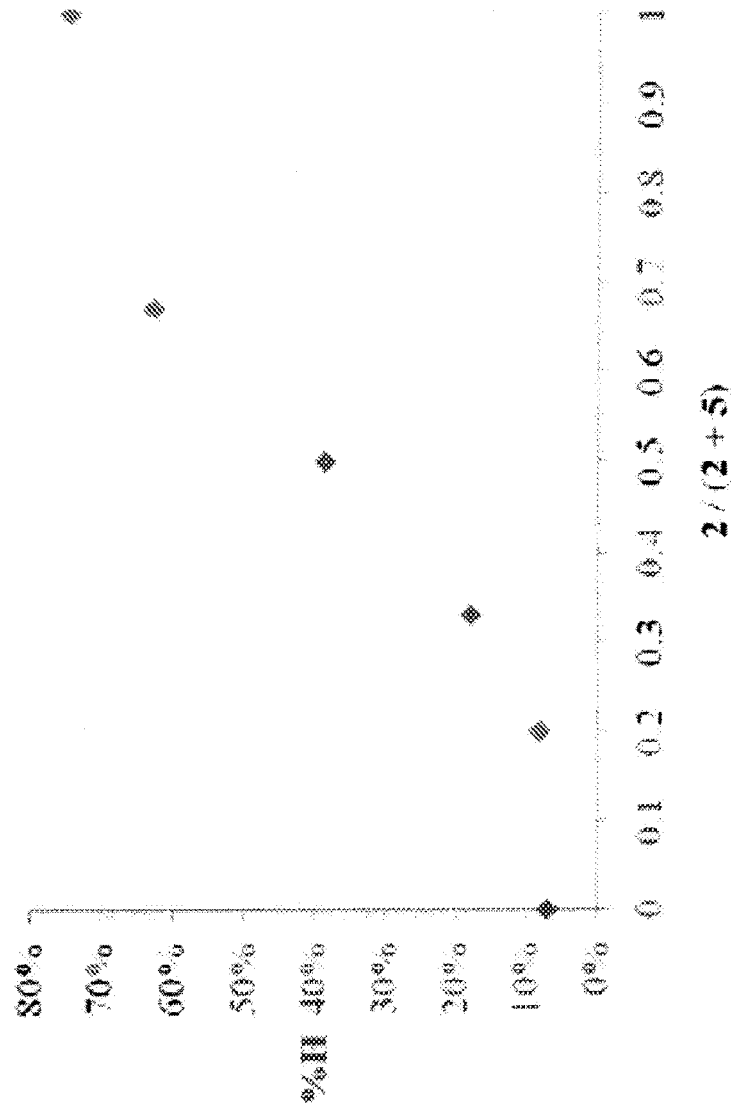
FIG. 2 shows the incorporation ratios of 1-hexene as a function of the concentration of the $[PhNHMe_2][(B(C_6F_5)_4]/$(the sum of the concentration of $[PhNHMe_2][(B(C_6F_5)_4]$ and $B(C_6F_5)_3$).
Figure 3:
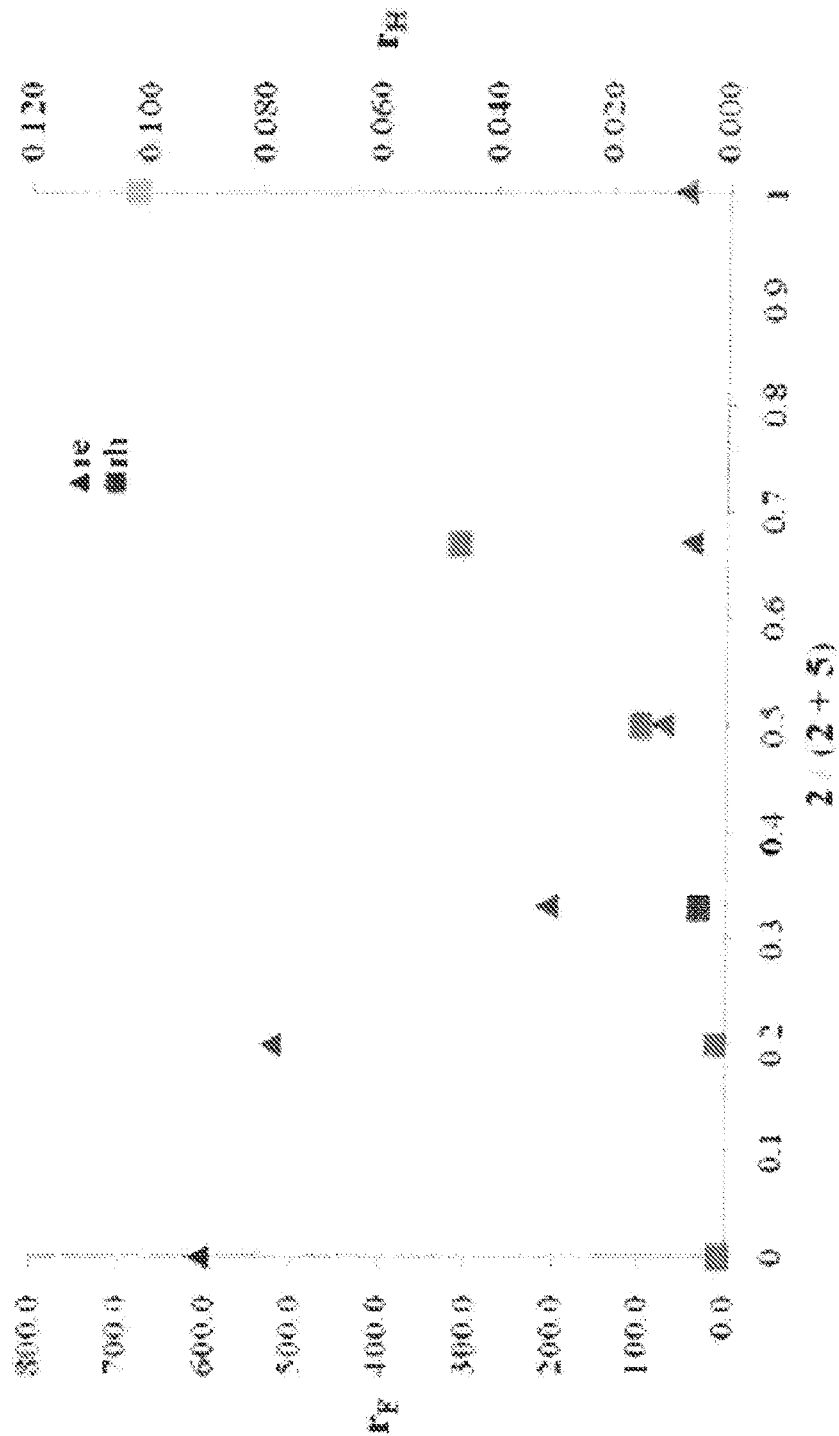
FIG. 3 shows the reactivity ratios ($r_e$ and $r_h$) as a function of the concentration of $[PhNHMe_2][(B(C_6F_5)_4]/$(the sum of the concentration of $[PhNHMe_2][(B(C_6F_5)_4]$ and $B(C_6F_5)_3$).
Figure 4:
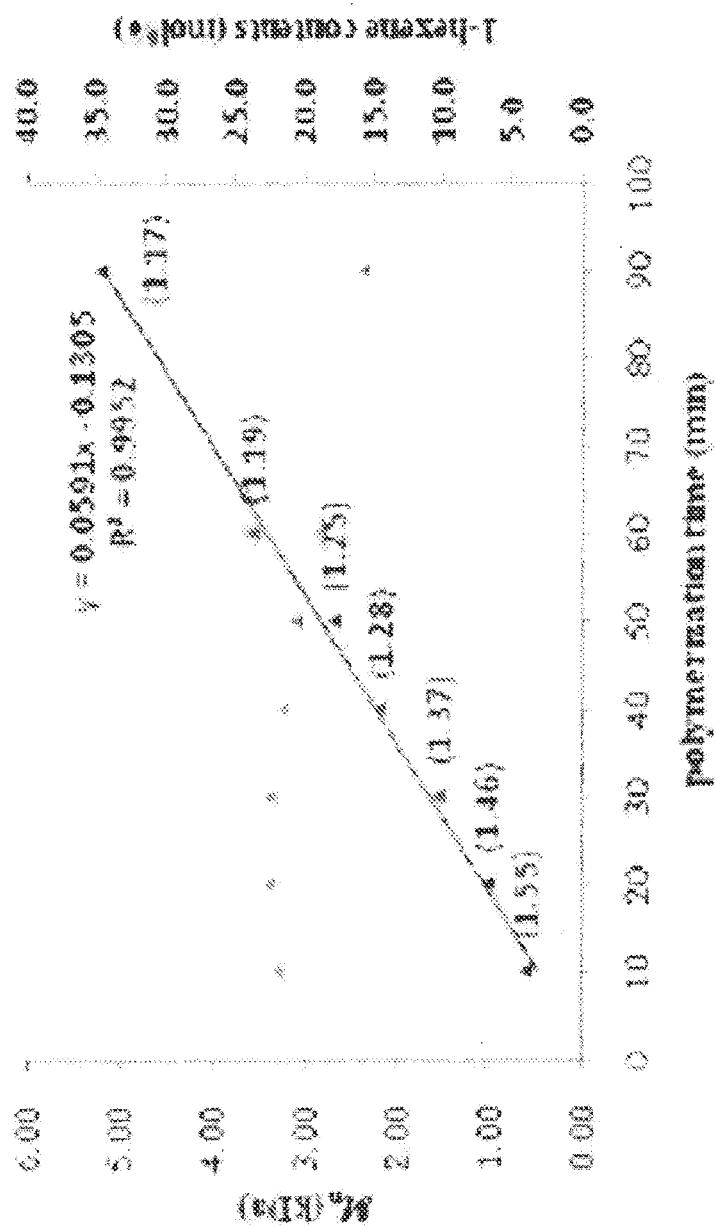
FIG. 4 shows the results of a kinetic study of (a) number average molecular weight ($M_n$) of the polymer product on the left y-axis and (b) 1-hexene content in mol % of the polymer product on the right y-axis as a function of polymerization time.
Figure 5:
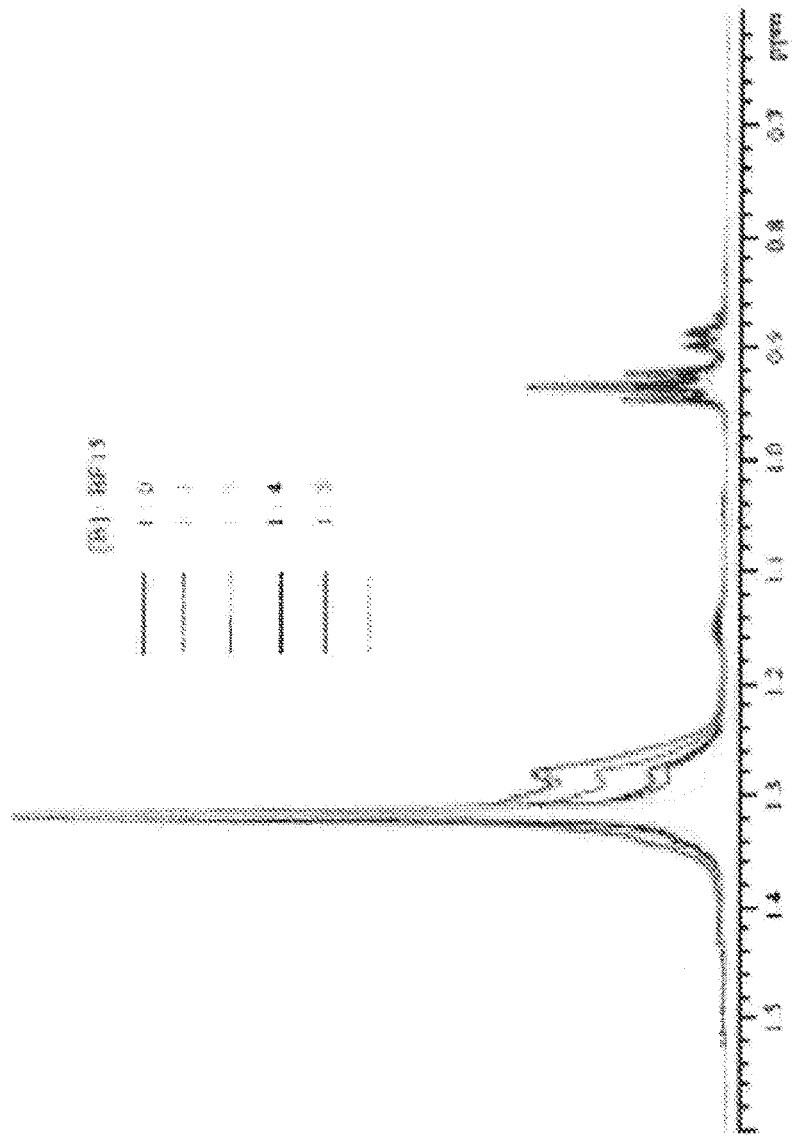
FIG. 5 is a $^1H$ NMR spectrum of product samples prepared with various ratios of co-catalyst A to co-catalyst B.

"Metallocene" is used herein to mean any organometallic coordination complex containing at least one or more σ-bonded or η"-bonded ligands coordinated with a metal atom from Groups IIIB to VIII or the Lanthanide series of the Periodic Table of the Elements. An example of a σ-bonded or η"-bonded ligand is the cyclopentadienyl ring. Examples of the metal atoms are the metals of Group IVB such as titanium, zirconium, or hafnium.

A stereoregular macromolecule is understood to be a macromolecule that comprises substantially one species of stereorepeating unit. Examples include, but are not limited to, an isotactic macromolecule, a syndiotactic macromolecule, and an atactic macromolecule. A stereoblock macromolecule is understood to be a block macromolecule composed of at least one or more stereoregular, and possibly, non-stereoregular blocks. An example is isotactic-poly(propylene)-block-atactic-poly(propylene).

An atactic polymer is a regular polymer, the molecules of which have equal numbers of the possible configurational base units in a random sequence distribution. In an atactic polymer, the polymer microstructure will contain stereocenters along the polymer backbone that have random relative configurations.

An amorphous polymer is a polymer in which there is no long-range order amongst different polymer chains that would impart crystallinity to the material.

As used herein, the term "polyolefin" comprises olefin homopolymers, co-polymers, and block copolymers.

The term "about" is used herein to mean the given number plus or minus 1 to 10%.

"Living polymerization" is used herein to mean a polymerization process with substantially no chain-growth stopping reactions, such as irreversible chain transfer and chain termination. Living polymerization allows for control over molecular weights and provide narrow molecular weight distributions. "Dormant species" is used to mean a species that cannot actively engage in propagation through chain enchainment of the monomer until it is converted into an active species through a reversible chemical process, such as a polymer chain coordinated to a neutral metal center. "Active species" is used to mean a species that can engage in propagation through chain enchainment of the monomer, such as a polymer chain coordinated to a cationic metal center. "Surrogate species" is used to define a main group metal alkyl that cannot engage in direct propagation through chain-enchainment of monomer but that can engage in reversible polymer chain transfer with an active or dormant species with a rate of chain-transfer that is at least equal in magnitude to that of the rate of propagation but preferably several times faster.

"Precision hydrocarbon" is used herein to mean a class of polyolefins that are distinguished by having programmable and architecturally-discrete carbon-carbon bonded frameworks, very low molecular weights, and extremely narrow molecular weight distributions.

Monomodal in molecular weight distribution (MWD) is used herein to mean a composition of polymers that comprise one distinct molecular weight distribution. Typically, the MWD is a range of molecular weights that may range in a number average molecular weight ($M_n$) of about 500 Da to about 500,000 Da. The MWD of a polymer can be measured using any method known to one skilled in the relevant art, for example, size exclusion chromatography and gel permeation chromatography (GPC).

"Polydispersity index" is used herein as a measure of the MWD for a given polymer composition. A polydispersity index of one refers to a monodisperse composition. The polydispersity index is a ratio of weight average molecular weight ($M_w$) to number average molecular weight ($M_n$). In one embodiment, polymer compositions made according the present invention have low polydispersity index, for example, about 1.01-1.40. However, other embodiments of the present invention may have a low polydispersity index that is defined as being within the range of 1.01-1.60. A polydispersity index may also be within the range of 1.2-1.8 and still be classified as having been produced by the present invention if the rate of reversible chain-transfer between active and surrogate species is close in magnitude to the rate of propagation of the active species.

Coordinative chain-transfer polymerization (CCTP) employs added equivalents of a metal alkyl that can serve in the capacity of "surrogate" metal chain-growth sites. CCTP employs highly efficient and reversible chain (polymeryl group, $P_A$ and $P_B$) transfer between active transition metal propagating centers ($M_A$) and chain-growth-inactive main group metal alkyl centers ($M_B$). If the rate constant for chain-transfer exchange between the active and inactive metal centers, $k_{ct}$, is several times greater than the rate constant for propagation, $k_p$, then both the transition and main group metal centers will effectively appear to engage in chain-growth propagation at the same rate while also maintaining all the desired features of a living polymerization (Hustad, P. D., et al., *Macromolecules* 41:4081-4089 (2008); Muller, A. H. E., et al., *Macromolecules* 28:4326-4333 (1995)). Indeed, under these conditions, $X_n$, will be governed by both the quantity of monomer consumed and the total concentration of all polymeryl groups, $P_A$ and $P_B$, that are formally engaged in active chain growth and more precisely by: $X_n = \{[\text{monomer}]_t - [\text{monomer}]_0\}/([(M-P_A)^+ + (n)(M'-P_B)]_0)$; where n is the number of equivalent polymeryl groups per main group metal (e.g. n=2 for $ZnR_2$). The molecular weight polydispersity index, D ($=M_w/M_n$), will further be approximately determined by the relative magnitudes of the rate constants for these two processes according to: $D \approx 1 + (k_p/k_{ct})$ (Müller, A. H. E., et al., *Macromolecules* 28:4326-4333 (1995)). Finally, the quantity of polymer product is clearly no longer capped by the amount of transition metal catalyst, but rather, on the total molar equivalents of the much less expensive and readily available main group metal alkyl ($M_B$) that is employed.

Although highly desirable for beating the "one polymer chain per active metal center" restriction of living Ziegler-Natta polymerizations, CCTP has only been successfully demonstrated in non-living fashion for ethene polymerization and for the 'chain-shuttling' copolymerization of ethene and 1-octene employing two different single-site catalysts for the production of 'blocky' polyolefin copolymers ((for a recent review and references for CCTP of ethene using main group metal alkyls, see: Kempe, R., *Chem. Eur. J.* 13: 2764-2773 (2007); Pelletier, J. F., et al., *Angew. Chem. Int. Ed. Engl.* 35:1854-1856 (1996); Chenal, T., et al., *Polymer* 48:1844-1856 (2007); Britovsek, G. J. P., et al., *Angew. Chem. Int. Ed.* 41:489-491 (2002); Britovsek, G. J. P., et al., *J. Am. Chem. Soc.* 126:10701-10712 (2004); van Meurs, M., et al., *J. Am. Chem. Soc.* 127:9913-9923 (2005); Rogers, J. S., et al., *Chem. Commun.* 1209-1210 (2000); Bazan, G. C., et al., *Organometallics* 20:2059-2064 (2001); Math, G., et al., *Organometallics* 23:4608-4613 (2004); Mani, G., et al., *Angew. Chem. Int. Ed.* 43:2263-2266 (2004); Ganesan, M., et al., *J. Organomet. Chem.* 690:5145-5149 (2005); Kretschmer, W. P., et al., *Chem. Eur. J.* 12:8969-8978 (2006)); (for a 'chain-shuttling' process based on the concept of CCTP with two different catalysts and diethyl zinc ($ZnEt_2$) for the copolymerization of ethene/1-octene that produces 'blocky' poly(ethene-co-1-octene), see: Arriola, D. J., et al., *Science* 312:714-719 (2006); Hustad, P. D., et al., *Macromolecules* 40:7061-7064 (2007); Hustad, P. D., *Macromolecules* 41:4081-4089 (2008))).

For successful realization of CCTP under living or non-living conditions, it has already been convincingly demonstrated that substantial difficulties exist in identifying the right combinations of pre-catalyst, co-catalyst, main group metal alkyl chain-transfer agent, and polymerization conditions under which rapid, reversible, and highly efficient chain-transfer (including chain-shuttling between two different active propagating centers) can occur (van Meurs, M., et al., *J. Am. Chem. Soc.* 127:9913-9923 (2005); Alfano, F., et al., *Macromolecules* 40:7736-7738 (2007)).

Living coordinative chain transfer polymerization can be considered as degenerative chain-transfer coordination polymerization, which is mechanistically distinct from a living degenerative group transfer coordination polymerization process. (Zhang, Y., et al., *J. Am. Chem. Soc.* 125:9062-9069

(2003); Zhang, Y., et al., *J. Am. Chem. Soc.* 126:7776-7777 (2004); Harney, M. B., et al., *Angew. Chem. Int. Ed.* 45:2400-2404 (2006); Harney, M. B., et al., *Angew. Chem. Int. Ed.* 45:6140-6144 (2006)).

The present invention provides a strategy to control the propagation rates of ethene and 1-hexene in copolymerization based on adjusting stoichiometric amounts of strong and weak ion-pairs of cationic transition chain propagation centers and anionic counter ions. The immediate benefit of this strategy is the production of a series of ethene copolymers with tunable 1-hexene incorporation ratios. This strategy involves only a single type of transition metal pre-catalyst and there is no need to modify the polymerization temperature, ethylene pressure, comonomer/ethylene feed ratio, or solvent to influence the comonomer incorporation level ((for poly (ethylene-co-hexene) see Carlini, C., et al., *Polymer* 48:1185-1192 (2007); Dankova, M., et al., *Macromolecules* 36:3815-3820 (2003); Huang, J., et al., *Macromolecules* 35:4871-4874 (2002); Wu, J.-O., et al., *Journal of Polymer Science: Part A: Polymer Chemistry* 47:3573-3582 (2009); Nomura, K., et al., *Journal of Molecular Catalysis A: Chemical* 152:3573-3582 (2000); Nomura, K., et al., *Journal of Molecular Catalysis A: Chemical* 15:127-137 (2000)) (for poly(ethylene-co-octene) see Itagaki, K., et al., *Journal of Molecular Catalysis A: Chemical* 303:102-109 (2009); Shan, C. L. P., et al., *Journal of Polymer Science, Part A: Polymer Chemistry* 40:4426-4451 (2002); Suhm, J., et al., *Journal of Polymer Science, Part A: Polymer Chemistry* 35:735-740 (1997))).

The present invention provides a method of producing a polyolefin composition comprising contacting a metal alkyl and a first olefin monomer; adding a first co-catalyst, a second co-catalyst, a metallocene pre-catalyst, and a second olefin monomer, wherein the first co-catalyst and the second co-catalyst are different; and polymerizing said first and second monomers for a time sufficient to form a polyolefin block copolymer.

Metallocene catalysts for use in the present invention include any metallocene pre-catalyst that initiates the polymerization of an olefin monomer. Specific examples include, but are not limited to single-site metallocene pre-catalyst such as those disclosed in Hlatky, G. G., et al., *J. Am. Chem. Soc.* 111:2728-2729 (1989); Jayaratne, K. C., et al., *J. Am. Chem. Soc.* 122:958-959 (2000); Jayaratne, K. C., et al., *J. Am. Chem. Soc.* 122:10490-10491 (2000); Keaton, R. J., et al., *J. Am. Chem. Soc.* 122:12909-12910 (2000); and Keaton, R. J., et al., *J. Am. Chem. Soc.* 123:6197-6198 (2001).

Illustrative but non-limiting examples of metallocene pre-catalysts for use in the present invention include dialkyl metallocenes such as bis(cyclopentadienyl)titanium dimethyl, bis(cyclopentadienyl)titanium diphenyl, bis(cyclopentadienyl)zirconium dimethyl, bis(cyclopentadienyl)zirconium diphenyl, bis(cyclopentadienyl)hafnium methyl and diphenyl, bis(cyclopentadienyl)titanium di-neopentyl, bis(cyclopentadienyl)zirconium di-neopentyl, bis(cyclopentadienyl) titanium dibenzyl, bis(cyclopentadienyl)zirconiumdibenzyl, bis(cyclopentadienyl)vanadium dimethyl; the mono alkyl metallocenes such as bis(cyclopentadienyl)titanium methyl chloride, bis(cyclopentadienyl)titanium ethyl chloride, bis (cyclopentadienyl)titanium phenyl chloride, bis(cyclopentadienyl)zirconium methyl chloride, bis(cyclopentadienyl)zirconium ethyl chloride, bis(cyclopentadienyl)zirconium phenyl chloride, bis(cyclopentadienyl)titanium methyl bromide; the trialkyl metallocenes such as cyclopentadienyl titanium trimethyl, cyclopentadienyl zirconium triphenyl, and cyclopentadienyl zirconium trineopentyl, cyclopentadienyl zirconium trimethyl, cyclopentadienyl hafnium triphenyl, cyclopentadienyl hafnium trineopentyl, and cyclopentadienyl hafnium trimethyl; monocyclopentadienyl titanocenes such as pentamethylcyclopentadienyl titanium trichloride, pentaethylcyclopentadienyl titanium trichloride, bis(pentamethylcyclopentadienyl)titanium diphenyl; the carbene represented by the formula bis(cyclopentadienyl)titanium=CH2 and derivatives of this reagent; substituted bis(cyclopentadienyl)titanium (IV) compounds such as bis(indenyl)titanium diphenyl or dichloride, bis(methylcyclopentadienyl)titanium diphenyl or dihalides; dialkyl, trialkyl, tetraalkyl and pentaalkyl cyclopentadienyl titanium compounds such as bis(1,2-dimethylcyclopentadienyl)titanium diphenyl or dichloride, bis(1,2-diethylcyclopentadienyl)titanium diphenyl or dichloride; silicon, phosphine, amine or carbon bridged cyclopentadiene complexes such as dimethyl silyldicyclopentadienyl titanium diphenyl or dichloride, methyl phosphine dicyclopentadienyl titanium diphenyl or dichloride, methylenedicyclopentadienyl titanium diphenyl or dichloride and other dihalide complexes, and the like, as well as isopropyl(cyclopentadienyl)(fluorenyl)zirconium dichloride, isopropyl(cyclopentadienyl)(octahydrofluorenyl)zirconium dichloride, diphenylmethylene(cyclopentadienyl)(fluorenyl)zirconium dichloride, diisopropylmethylene(cyclopentadienyl)(fluorenyl)zirconium dichloride, diisobutylmethylene(cyclopentadienyl)(fluorenyl)zirconium dichloride, ditertbutylmethylene(cyclopentadienyl)(fluorenyl)zirconium dichloride, cyclohexylidene(cyclopentadienyl)(fluorenyl)zirconium dichloride, diisopropylmethylene(2,5-dimethylcyclopentadienyl)(fluorenyl)zirconium dichloride, isopropyl(cyclopentadienyl)(fluorenyl)hafnium dichloride, diphenylmethylene(cyclopentadienyl)(fluorenyl)hafnium dichloride, diisopropylmethylene(cyclopentadienyl)(fluorenyl)hafnium dichloride, diisobutylmethylene(cyclopentadienyl)(fluorenyl)hafnium dichloride, ditertbutylmethylene(cyclopentadienyl)(fluorenyl)hafnium dichloride, cyclohexylidene(cyclopentadienyl)(fluorenyl)hafnium dichloride, diisopropylmethylene(2,5-dimethylcyclopentadienyl)(fluorenyl)hafnium dichloride, isopropyl(cyclopentadienyl)(fluorenyl)titanium dichloride, diphenylmethylene(cyclopentadienyl)(fluorenyl)titanium dichloride, diisopropylmethylene(cyclopentadienyl)(fluorenyl)titanium dichloride, diisobutylmethylene(cyclopentadienyl)(fluorenyl)titanium dichloride, ditertbutylmethylene(cyclopentadienyl)(fluorenyl)titanium dichloride, cyclohexylidene(cyclopentadienyl)(fluorenyl)titanium dichloride, diisopropylmethylene(2,5-dimethylcyclopentadienyl)(fluorenyl)titanium dichloride, racemic-ethylene bis(1-indenyl)zirconium (IV) dichloride, racemic-ethylene bis(4,5,6,7-tetrahydro-1-indenyl)zirconium (IV) dichloride, racemic-dimethylsilyl bis(1-indenyl) zirconium (IV) dichloride, racemic-dimethylsilyl bis(4,5,6,7-tetrahydro-1-indenyl)zirconium (IV) dichloride, racemic-1,1,2,2-tetramethylsilanylene bis(1-indenyl)zirconium (IV) dichloride, racemic-1,1,2,2-tetramethylsilanylene bis(4,5,6,7-tetrahydro-1-indenyl)zirconium (IV) dichloride, ethylidene (1-indenyl-tetramethylcyclopentadienyl)zirconium (IV) dichloride, racemic-dimethylsilyl bis(2-methyl-4-t-butyl-1-cyclopentadienyl)zirconium (IV) dichloride, racemic-ethylene bis(1-indenyl)hafnium (IV) dichloride, racemic-ethylene bis(4,5,6,7-tetrahydro-1-indenyl)hafnium (IV) dichloride, racemic-dimethylsilyl bis(1-indenyl)hafnium (IV) dichloride, racemic-dimethylsilyl bis(4,5,6,7-tetrahydro-1-indenyl)hafnium (IV) dichloride, racemic-1,1,2,2-tetramethylsilanylene bis(1-indenyl)hafnium (IV) dichloride, racemic-1,1,2,2-tetramethylsilanylene bis(4,5,6,7-tetrahydro-1 indenyl)hafnium (IV) dichloride, ethylidene (1-indenyl-2,3,4,5-tetramethyl-1-cyclopentadienyl)hafnium (IV) dichloride, racemic-ethylene bis(1-indenyl)titanium (IV) dichloride, racemic-ethylene bis(4,5,6,7-tetrahydro-1-indenyl)titanium (IV) dichloride, racemic-dimethylsilyl bis(1-indenyl)titanium (IV) dichloride, racemic-dimethylsilyl bis(4,5,6,7-tetrahydro-1-indenyl)titanium (IV) dichloride, racemic-1,1,2,2-tetramethylsilanylene bis(1-indenyl)titanium (IV) dichloride, racemic-1,1,2,2-tetramethylsilanylene bis(4,5,6,7-tetrahydro-1-indenyl)titanium (IV) dichloride, and ethylidene (1-indenyl-2,3,4,5-tetramethyl-1-cyclopentadienyl)titanium (IV) dichloride, (N-tert-butylamido)(dimethyl)(tetramethyl-$\eta^5$-cyclopentadienyl)silane scandium hydride triphenylphosphine dimer, (N-tert-butylamido)(dimethyl)(tetramethyl-$\eta^5$-cyclopentadienyl)silane scandium hydride, (2,5-dimethyltetrahydrofuran)(N-tert-butylamido)(dimethyl)(tetramethyl-$\eta^5$-cyclopentadienyl)silane scandium bis(trimethylsilyl)methyl, (N-phenylamido)(dimethyl)(tetramethyl-$\eta^5$-cyclopentadienyl)silane scandium bis(trimethyl)methyl, (N-secbutylamido)(dimethyl)(tetramethyl-$\eta^5$-cyclopentadienyl)silane scandium bis(trimethylsilyl)methyl, (N-tert-butylamido)(dimethyl)(tetramethyl-$\eta^5$-cyclopentadienyl)silane scandium methyltribenzylphosphine, (N-tert-butylamido)(dimethyl)(tetramethyl-$\eta^5$-cyclopentadienyl)silane scandium methyl, (2,5-dimethyltetrahydrofuran)(N-tert-butylamido)(dimethyl)(tetramethyl-$\eta^5$-cyclopentadienyl)silane scandium benzyl triphenylphosphine, (N-tert-butylamido)(dimethyl)(fluorenyl)silane scandium hydride triphenylphisphine, (N-sec-dodecylamido)(dimethyl)(fluorenyl)silane scandium hydride, (2,5-dimethyltetrahydrofuran)(N-butylamido)(dimethyl)(tetramethyl-$\eta^5$-cyclopentadienyl)silane scandium bis(trimethylsilyl)methyl, (N-tert-butylphospho)(dimethyl)(tetramethyl-$\eta^5$-cyclopentadienyl)silane scandium bis(trimethyl-$\eta^5$-cyclopentadienyl)silane scandium bis(trimethylsilyl)methyl, (N-tert-butylamido)(dimethyl)(octahydrofluorenyl)silane scandium methyltriphenylphosphine, (N-tert-butylamido)(dimethyl)(indenyl)silane scandium methyl (2,5-dimethyltetrahydrofuran, and (N-tert-butylamido)(dimethyl)(tetrahydroindenyl)silane scandium 2-(N,N-dimethylamino)dibenzyl triphenylphosphine.

In one embodiment, the metallocene pre-catalyst for use in the present invention has the formula:

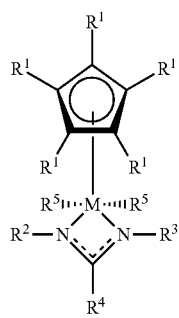

wherein the dotted lines indicate a delocalized bond;
M is Ti, Zr, Hf, V, Nb, or Ta;
each $R^1$ is independently hydrogen or alkyl or two adjacent $R^1$ form an aromatic ring;
each $R^2$, $R^3$, and $R^4$ is independently alkyl, cycloalkyl, Si(alkyl)$_3$, Si(aryl)$_3$, phenyl, optionally substituted phenyl, or alkylphenyl; and
each $R^5$ is halo, alkyl, cycloalkyl, aryl, or arylalkyl.

As used herein, "alkyl" refers to straight- or branched-chain hydrocarbons having from 1 to 10 carbon atoms and more preferably 1 to 8 carbon atoms, including by way of example methyl, ethyl, propyl, iso-propyl, iso-butyl, and t-butyl.

"Aryl" by itself or as part of another group refers to monocyclic, bicyclic, or tricyclic aromatic groups containing 6 to 14 carbon atoms in the ring position. Useful aryl groups include $C_{6-14}$ aryl, preferably $C_{6-10}$ aryl. Typical $C_{6-14}$ aryl groups include phenyl, naphthyl, indenyl, phenanthrenyl, anthracenyl, fluorenyl, and biphenyl groups.

"Arylalkyl" refers to an alkyl group mentioned above substituted by a single aryl group including, by way of example, benzyl, phenethyl, and naphthylmethyl.

"Alkylarylalkyl" refers to an alkyl group mentioned above substituted by a single aryl group, wherein the aryl group is further substituted by one or more alkyl groups. Examples include, without limitation, 4-methylbenzyl and 4-ethylphenethyl.

"Cycloalkyl" refers to cyclic alkyl groups containing between 3 and 8 carbon atoms having a single cyclic ring including, by way of example, cyclopropyl, cyclobutyl, cyclopentyl, cyclooctyl, and the like.

"Optionally substituted phenyl" refers to a phenyl ring which may contain 1 to 5 electron donating or electron withdrawing groups. By way of example, electron-donating groups include, but are not limited to amino, hydroxy, alkoxy, amide, aryl, and alkyl. Examples of electron withdrawing groups include, but are not limited to, halo, ketone, ester, —SO$_3$H, aldehyde, carboxylic acid, cyano, nitro, and ammonium.

"Alkylphenyl" refers to an alkyl group mentioned above substituted by a single phenyl group including, by way of example, benzyl, 1-phenethyl, 1-phenylpropyl, 1-phenylbutyl, 2-phenethyl, 2-phenylpropyl, 2-phenylbutyl, 3-phenylpropyl, and 3-phenylbutyl.

"Halo" refers to fluoro, chloro, bromo, and iodo.

"Aromatic ring" refers to an unsaturated carbocyclic group of 6 to 14 carbon atoms having a single ring (e.g., phenyl) or multiple condensed rings (e.g., naphthyl or anthryl). The metallocene catalysts of the present invention can be prepared using any suitable method known to one skilled in the relevant art. The method of synthesis of the metallocene catalysts is not critical to the invention.

In one embodiment, the metallocene pre-catalyst is ($\eta^5$-C$_5$Me$_5$)Hf(Me)$_2$[N(Et)C(Me)N(Et)].

The co-catalyst is capable of activating the metallocene pre-catalyst. Preferably, the co-catalyst is one of the following: (a) ionic salts of the general formula [A$^+$][$^-$BR$^6_4$], wherein A$^+$ is Si(R$^7$)$_3$, a cationic Lewis acid or a cationic Brønsted acid, B is the element boron, R$^6$ is phenyl or an optionally substituted phenyl or (b) a boron alkyl of the general formula BR$^6_3$ and each R$^7$ is independently selected from alkyl and optionally substituted phenyl. Examples of Lewis or Brønsted acids that may be used in the practice of the invention include, but are not limited to tetra-n-butylammonium, triphenylcarbonium, and dimethylanilinium cations.

Examples of co-catalysts for use in the present invention include, but are not limited to, [PhNHMe$_2$][B(C$_6$F$_5$)$_4$], [Ph$_3$C][B(C$_6$F$_5$)$_4$], and B(C$_6$F$_5$)$_3$.

The co-catalyst can be strongly coordinating co-catalyst or a weakly coordinating co-catalyst.

The metal alkyl is capable of activating reversible chain transfer with active transition metal-based propagating centers. Examples of metal alkyls that may be used in the practice of this invention include main group metal alkyls such as Zn(R$^8$)$_2$ and Al(R$^8$)$_3$, wherein R$^8$ is an alkyl. Mixtures comprised of two or more metal alkyls may also be used in the practice of this invention.

Examples of metal alkyls for use in the present invention include AlEt$_3$, AlMe$_3$, Al(iso-butyl)$_3$, Al(n-hexyl)$_3$, Al(n-propyl)$_3$, and Al(t-butyl)$_3$. In one embodiment of the present invention, the metal alkyl is AlEt$_3$. In another embodiment, the metal alkyl is Al(iso-butyl)$_3$. In another embodiment, the metal alkyl is Al(n-propyl)$_3$.

Examples of metal alkyls include ZnMe$_2$, ZnEt$_2$, Zn(n-butyl)$_2$, Zn(isoamyl)$_2$, Zn(t-butyl)$_2$, Zn(neopentyl)$_2$, Zn(n-propyl)$_2$, and Zn(iso-propyl)$_2$. In one embodiment of the present invention, the metal alkyl is ZnEt$_2$. In another embodiment of the present invention, the metal alkyl is Zn(iso-propyl)$_2$. In one embodiment of the present invention, a 1:1 mixture of AlEt$_3$ and ZnEt$_2$ is used.

The method of the present invention comprises contacting a metal alkyl and a first olefin monomer, then adding a first co-catalyst, a second co-catalyst, a pre-catalyst, and a second olefin monomer. In one embodiment, a stoichiometric excess of a metal alkyl is used. "Stoichiometric excess" is used herein to mean an amount more than an equivalent amount of the metallocene pre-catalyst and/or the co-catalyst. For example, the metal alkyl and metallocene pre-catalyst can be added together in a ratio of metal alkyl:metallocene pre-catalyst in the range of about 1:1 to about 1000:1 or about 1:1 to about 500:1. In another embodiment, the ratio of metal alkyl:metallocene pre-catalyst is in the range of about 1.1:1 to about 100:1. In another embodiment, the ratio of metal alkyl:metallocene pre-catalyst is in the range of about 1.1:1 to about 50:1. In an alternative example, the ratio of metal alkyl:metallocene pre-catalyst is about 1.1:1, 1.2:1, 1.5:1, 1.8:1, 2:1, 2.2:1, 2.5:1, 3:1, 4:1, 5:1, 10:1, 18:1, 20:1, 25:1, 50:1, 75:1, 100:1, or 200:1.

In an embodiment of the present invention, the first co-catalyst and metallocene pre-catalyst can be added together in a ratio of first co-catalyst:metallocene pre-catalyst in the range of about 0.1:1 to about 20:1. In another embodiment, the ratio of first co-catalyst:metallocene pre-catalyst is in the range of about 0.1:1 to about 10:1. In another embodiment, the ratio of first co-catalyst:metallocene pre-catalyst is in the range of about 0.1:1 to about 2:1. In an alternative example, the ratio of first co-catalyst:metallocene pre-catalyst is about 0.1:1, 0.5:1, 1:1, 1.5:1, 1.8:1, 2:1, 2.2:1, 2.5:1, 3:1, 4:1, 5:1, 10:1, 18:1, or 20:1.

In an embodiment, the metallocene pre-catalyst and second co-catalyst can be added together in a ratio of metallocene pre-catalyst:co-catalyst in the range of about 0.1:1 to about 20:1. In another embodiment, the ratio of first co-catalyst:metallocene pre-catalyst is in the range of about 0.1:1 to about 10:1. In another embodiment, the ratio of first co-catalyst:metallocene pre-catalyst is in the range of about 0.1:1 to about 2:1. In an alternative example, the ratio of first co-catalyst:metallocene pre-catalyst is about 0.1:1, 0.5:1, 1:1, 1.5:1, 1.8:1, 2:1, 2.2:1, 2.5:1, 3:1, 4:1, 5:1, 10:1, 18:1, or 20:1.

In an embodiment of the present invention, the first co-catalyst and the second co-catalyst are added together in a ratio of first co-catalyst:second co-catalyst in the range of about 0.1:1 to about 500:1 or about 0.1:1 to about 200:1. In another embodiment, the ratio of first co-catalyst:second co-catalyst is in the range of about 2:1 to about 50:1. In an alternative example, the ratio of first co-catalyst:second co-catalyst is about 0.1:1, 0.5:1, 1:1, 1.2:1, 1.5:1, 1.8:1, 2:1, 2.2:1, 2.5:1, 3:1, 4:1, 5:1, 7:1, 9:1, 10:1, 19:1, 25:1, 50:1, 75:1 or 90:1.

In an embodiment of the present invention, the first co-catalyst and the second co-catalyst are added together in a ratio of second co-catalyst:first co-catalyst in the range of about 0.1:1 to about 500:1 or about 0.1:1 to about 200:1. In another embodiment, the ratio of second co-catalyst:first co-catalyst is in the range of about 2:1 to about 50:1. In an alternative example, the ratio of second co-catalyst:first co-catalyst is about 0.1:1, 0.5:1, 1:1, 1.2:1, 1.5:1, 1.8:1, 2:1, 2.2:1, 2.5:1, 3:1, 4:1, 5:1, 9:1, 10:1, 19:1, 25:1, 50:1, 75:1 or 90:1.

The pre-catalyst, the first co-catalyst, and the second co-catalyst can be contacted at the same time. Alternatively, the first co-catalyst and the second co-catalyst can be contacted to form a co-catalyst composition which is then contacted with a pre-catalyst. In one embodiment, the first co-catalyst and the pre-catalyst can be contacted to form a first catalyst composition which is then contacted with the second co-catalyst. In another embodiment, the second co-catalyst and the pre-catalyst can be contacted to form a second catalyst composition which is then contacted with the first co-catalyst.

The metal alkyl and the first olefin monomer can be contacted neat, or in some suitable solvent. Suitable solvents for use in the present invention include inert liquid hydrocarbons that are nonreactive under the polymerization conditions employed. Although such an inert liquid hydrocarbon need not function as a solvent for the catalyst composition or the polymer obtained by the process, it usually serves as solvent for the monomers employed in the polymerization. Among the inert liquid hydrocarbons suitable for this purpose include, but are not limited to, chlorobenzene, dichlorobenzene, isopentane, hexane, cyclohexane, heptane, benzene, toluene, trifluorotoluene, pentane, octane, isooctane, dichloromethane. In one embodiment, the solvent is toluene.

The pre-catalyst, first co-catalyst, and second co-catalyst can be contacted neat, or in some suitable solvent. Suitable solvents for use in the present invention include inert liquid hydrocarbons that are nonreactive under the polymerization conditions employed. Although such an inert liquid hydrocarbon need not function as a solvent for the catalyst composition or the polymer obtained by the process, it usually serves as solvent for the monomers employed in the polymerization. Among the inert liquid hydrocarbons suitable for this purpose include, but are not limited to, chlorobenzene, dichlorobenzene, isopentane, hexane, cyclohexane, heptane, benzene, toluene, trifluorotoluene, pentane, octane, isooctane, dichloromethane. In one embodiment, the solvent is chlorobenzene.

The metal alkyl and the first olefin monomer can be contacted at any temperature. For example, the temperature of the activation reaction is from about −25° C. to about 40° C. or from about −10° C. to about 80° C. In one embodiment, the temperature is about 20° C. In another embodiment, the temperature is about 25° C.

The pre-catalyst, first co-catalyst, and second co-catalyst can be contacted at any temperature, preferably, the temperature results in the formation of an active catalyst composition for olefin polymerizations. For example, the temperature of the activation reaction is from about −25° C. to about 40° C. or from about −10° C. to about 80° C. In one embodiment, the temperature of the reaction is form about 10° C. to about 25° C. In one embodiment, the temperature is about 20° C. In another embodiment, the temperature is about 25° C.

After the pre-catalyst, first co-catalyst, second co-catalyst, and second olefin monomer are added to the mixture of the first olefin monomer and the metal alkyl, the reaction temperature can be any temperature. For example, the temperature of the activation reaction is from about −25° C. to about 40° C. or from about −10° C. to about 80° C. In one embodiment, the temperature of the reaction is form about 10° C. to about 25° C. In one embodiment, the temperature is about 20° C. In another embodiment, the temperature is about 25° C.

The metal alkyl and the first olefin monomer can be contacted for any length of time before addition of the first co-catalyst, the second co-catalyst, the pre-catalyst, and the second olefin monomer. In one embodiment, the metal alkyl and the first olefin monomer are contacted for about 1 minute to about 50 hours, about 2 minutes to about 20 hours, about 5 minutes to about 10 hours, about 10 minutes to about 1 hour, about 10 minutes to about 40 minutes, or about 15 minutes to about 30 minutes before addition. In one embodiment, the metal alkyl and first olefin monomer are contacted for about 30 minutes before addition.

The first co-catalyst, second co-catalyst, and pre-catalyst can be contacted for any length of time before the mixture is added to the metal alkyl and first olefin monomer mixture. In one embodiment, the first co-catalyst, second co-catalyst, and pre-catalyst are contacted for about 1 minute to about 50 hours, about 2 minutes to about 20 hours, about 5 minutes to about 10 hours, about 10 minutes to about 1 hour, about 10 minutes to about 40 minutes, or about 15 minutes to about 30 minutes. In another embodiment, the first co-catalyst, second co-catalyst, and pre-catalyst are contacted for about 30 minutes.

After addition of the first co-catalyst, second co-catalyst, pre-catalyst, and second olefin monomer to the metal alkyl and first olefin monomer mixture, the reaction mixture can be contacted for any length of time. In one embodiment, the activation reaction is ran for about 1 minute to about 50 hours, about 2 minutes to about 20 hours, about 5 minutes to about 10 hours, about 10 minutes to about 1 hour, about 10 minutes to about 40 minutes, or about 15 minutes to about 30 minutes. In another embodiment, the activation reaction is run for about 30 minutes.

The mixture of metal alkyl, first olefin monomer, pre-catalyst, first co-catalyst, second co-catalyst, and second olefin monomer can be contacted at any pressure. In one embodiment, the pressure is between about 0 psi to about 40 psi, about 2 psi to about 30 psi, about 3 psi to about 20 psi, or about 4 psi to about 10 psi. In another embodiment, the pressure is about 5 psi.

The comonomer incorporation level can be controlled by adjusting the stoichiometric amount of weak and strong chain propagation centers. In one embodiment, the incorporation level of the first olefin monomer is about 1.0 mol % to about 60 mol %, about 1.0 mol % to about 50 mol %, about 1.0 mol % to about 40 mol %, about 1.0 mol % to about 30 mol %, about 1.0 mol % to about 20 mol %, about 2.5% to about 22.6%, or about 2.5% to about 17%. In an alternative example, the incorporation level of the first olefin monomer is about 0.1%, 0.5%, 1.0%, 2.0%, 2.5%, 3.0%, 4.0%, 5.0%, 6.5%, 8.0%, 8.5%, 10.0%, 11.5%, 16%, 17.0%, 19%, 22%, or 23%.

In one embodiment, the incorporation level of the second olefin monomer is about 1.0 mol % to about 99 mol %, about 1.0 mol % to about 90 mol %, about 1.0 mol % to about 80 mol %, about 1.0 mol % to about 70 mol %, about 1.0 mol % to about 60 mol %, about 70 mol % to about 99 mol %, or about 80 mol % to about 99 mol %. In an alternative example, the incorporation level of the second olefin monomer is about 0.1%, 0.5%, 1.0%, 2.0%, 2.5%, 3.0%, 4.0%, 5.0%, 6.5%, 8.0%, 8.5%, 10.0%, 11.5%, 16%, 17.0%, 19%, 22%, or 23%, 60%, 70%, 80%, 85%, 90%, 95%, or 99%.

Olefin monomers for use in the invention include, but are not limited to, ethene, propene, 1-butene, 1-pentene, 1-hexene, 1-heptene, 1-octene, styrene, butadiene, isoprene, 3-methylbutene, 3-methyl-1-pentene, vinylcyclohexane, vinylcyclobutane, vinylcyclopentane, vinylcyclooctane, 1-decene, enantiomerically pure 0-citronellene, 3,5,5-trimethyl-1-hexene, 4-methyl-1-pentene or cyclic olefins such as cyclobutene, cyclopentene, cyclohexene, cyclooctene, and alkyl or aryl-substituted cyclic olefins. Olefin monomers for use also include conjugated or non-conjugated dienes, such as linear, branched, or cyclic hydrocarbon dienes having from about 4 to about 20, preferably 4 to 12, carbon atoms, including those dienes having the formula:

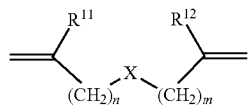

wherein X=CH$_2$, CO, N(R$^{13}$), O or S;
R$^{11}$, R$^{12}$ and R$^{13}$ are each independently H, alkyl or phenyl; and
n and m are each independently an integer from 0-5.

Dienes include 1,4-pentadiene, 1,5-hexadiene, 5-vinyl-2-norbornene, 1,7-octadiene, vinylcyclohexene, dicyclopentadiene, butadiene, isobutylene, isoprene and ethylidene norbornene.

In an embodiment of the present invention, the first olefin monomer is propene. In an embodiment of the present invention, the second olefin monomer is 1-hexene. In one example, the first olefin is ethene and the second olefin is 1-hexene. In another example, the first olefin in ethene and the second olefin is 1-octene.

The ratio of first olefin monomer to second olefin monomer can be, but is not limited to, the range of 1:100 to 100:1. In one embodiment, the ratio of the first olefin monomer to the second olefin monomer is about 1:1 to about 1000:1 or about 1:1 to about 500:1. In another embodiment, the ratio of first olefin monomer:second olefin monomer is in the range of about 1.1:1 to about 100:1. In another embodiment, the ratio of first olefin monomer:second olefin monomer is in the range of about 1.1:1 to about 50:1. In an alternative example, the ratio of first olefin monomer:second olefin monomer is about 1.1:1, 1.2:1, 1.5:1, 1.8:1, 2:1, 2.2:1, 2.5:1, 3:1, 4:1, 5:1, 10:1, 18:1, 20:1, 25:1, 50:1, 75:1, 100:1, or 200:1.

In an embodiment, polymerization methods of the present invention are flexible and allow for the manufacture of polyolefin compositions having various molecular weights. The molecular weights that are given, therefore, are not meant to be limiting. For example, polyolefin compositions of the present invention have number average molecular weight (M$_n$) greater that about 500. More particularly, the polyolefin compositions have number average molecular weight of about 1,000 to about 500,000. Methods of determining number average molecular weight of polyolefin compositions are well known to one of ordinary skill in the art. For example, gel permeation chromatography (GPC) may be used.

Polymer compositions made according to the present invention have low polydispersity index, for example, about 1.01-1.40. However, other embodiments of the present invention may have a low polydispersity index that is defined as being within the range of 1.01-1.60. A polydispersity index may also be within the range of 1.2-1.8 and still be classified as having been produced by the present invention if the rate of reversible chain-transfer between active and surrogate species is close in magnitude to the rate of propagation of the active species.

Having now generally described this invention, the same will be understood by reference to the following examples which are provided herein for purposes of illustration only and are not intended to be limiting unless otherwise specified.

EXAMPLES

All manipulations were performed under an inert atmosphere of dinitrogen using either standard Schlenk techniques or a Vacuum Atmospheres glovebox. Dry, oxygen-free solvents were employed throughout. Toluene was distilled from sodium. 1-hexene was vacuum transferred from NaK prior to use. Polymer grade ethene was purchased from Matheson Trigas, and passed through activated Q5 and molecular sieves (4 Å). ($\eta^5$-$C_5Me_5$)Hf(Me)$_2$[N(Et)C(Me)N(Et)] was prepared according to previously reported procedures. [PhNHMe$_2$][B(C$_6$F$_5$)$_4$] was purchased from Boulder Scientific. B(C$_6$F$_5$)$_3$ was obtained from Strem Inc. and used without further purification.

Gel permeation chromatography (GPC) analyses were performed using a Viscotek GPC system equipped with a column oven and differential refractometer both maintained at 45° C. and four columns also maintained at 45° C. Tetrahydrofuran was used as the eluant at a flow rate of 1.0 mL/min. $M_n$, $M_w$, and $M_w/M_n$ values were obtained using a Viscotek GPC with OmniSEC software (conventional calibration) and ten polystyrene standards ($M_n$=580 Da to 3,150 kDa) (Polymer Laboratories). $^{13}$C {$^1$H} NMR spectra were recorded at 150 MHz, using 1,1,2,2-tetrachloroethane-d$_2$ as the solvent at 90° C.

Example 1

Typical Procedure for Copolymerization (Run 2 of Table 1)

In a 250 mL Schlenk flask, to 40 mL of toluene at 25° C. was added ZnEt$_2$ (823 mg, 1.0 mmol, 50 equiv (based on the pre-catalyst)) as a 15% wt (1.1 M) solution in toluene and 1-hexene (5.05 g, 60.0 mmol, 3000 equiv (based on the pre-catalyst)) and stirred for 30 minutes. A clear yellow mixture of co-catalyst [PhNHMe$_2$][B(C$_6$F$_5$)$_4$] (8.0 mg, 0.010 mmol), co-catalyst B(C$_6$F$_5$)$_3$ (5.1 mg, 0.010 mmol), and pre-catalyst ($\eta^5$-$C_5Me_5$)Hf(Me)$_2$[N(Et)C(Me)N(Et)] (9.1 mg, 0.020 mmol) in 1.5 mL chlorobenzene was added to the Schlenk flask which was pressurized to 5 psi with ethene to initiate polymerization. After 30 minutes, polymerization was quenched with 1.0 mL of methanol. The polymer solution was precipitated into 600 mL of acidic methanol (10% concentrated HCl) to isolate the polymer. The final product was collected and dried overnight in vacuo. Yield: 2.1 g. GPC analysis: $M_w$=3,260 Da; $M_n$=2,610 Da; PDI=1.25.

Table 1 summarizes the results of copolymerization of ethene with 1-hexene using different ratios of co-catalyst [PhNHMe$_2$][B(C$_6$F$_5$)$_4$] to co-catalyst B(C$_6$F$_5$)$_4$. Entry 1 of Table 1 serves as a frame of reference where 1 equivalent of [PhNHMe$_2$][B(C$_6$F$_5$)$_4$] and 0 equivalents of B(C$_6$F$_5$)$_4$ in toluene provided, after 30 minutes at 25° C. and 5 psi of ethene, poly(ethylene-co-1-hexene) with a high 1-hexene incorporation level (17 mol % 1-hexene). Entry 2 of Table 1 shows that 1 equivalent of [PhNHMe$_2$][B(C$_6$F$_5$)$_4$] and 1 equivalent of B(C$_6$F$_5$)$_4$ in toluene provided, after 30 minutes at 25° C. and 5 psi of ethene, poly(ethylene-co-1-hexene) with a lessened 1-hexene incorporation level (15.9 mol % 1-hexene). Finally, entry 6 of Table 1 shows that 1 equivalent of [PhNHMe$_2$][B(C$_6$F$_5$)$_4$] and 7 equivalents of B(C$_6$F$_5$)$_4$ in toluene provided, after 30 minutes at 25° C. and 5 psi of ethene, poly(ethylene-co-1-hexene) with a lessened 1-hexene incorporation level (2.5 mol % 1-hexene). Therefore, it is possible to tune the level of 1-hexene incorporation by altering the ratio of the co-catalyst [PhNHMe$_2$][B(C$_6$F$_5$)$_4$] to the co-catalyst B(C$_6$F$_5$)$_4$. Thus, under a constant 1-hexene concentration and polymerization temperature, the 1-hexene incorporation level is only based on the stoichiometric ratio of strong and weak ion-pairs.

TABLE 1

Copolymerization of Ethylene with 1-Hexene.

| run | co-catalyst A: co-catalyst B | $t_p$ (min) | yield (g) | $M_n$ (Da) | PDI | 1-hexene contents (mol %) |
|---|---|---|---|---|---|---|
| 1 | 1:0 | 30 | 2.7 | 3.5k | 1.21 | 17.0 |
| 2 | 1:1 | 30 | 2.1 | 2.61k | 1.25 | 15.9 |
| 3 | 1:2 | 30 | 1.4 | 2.18k | 1.27 | 11.5 |
| 4 | 1:3 | 30 | 1.2 | 1.95k | 1.35 | 8.5 |
| 5 | 1:5 | 30 | 1.1 | 1.97k | 1.25 | 6.4 |
| 6 | 1:7 | 15 | 0.5 | ns | ns | 2.5 | ns = not soluble for GPC analysis

Example 2

The copolymerization behavior for different ratios of co-catalyst A and co-catalyst B was analyzed according to first-order Markov statistics. To investigate the effect of copolymerization conditions on comonomer incorporation, $^{13}$C NMR spectra of the copolymers were acquired under quantitative conditions. Copolymer compositions and n-ad distributions were calculated following Cheng's method (Cheng, H. N., Polym. Bull. (Berlin) 26:325-332 (1991)). Reactivity ratios for first-order Markov statistics, $r_e$ and $r_h$, were calculated from triad distributions (Reybek, S. E., et al., Macromolecules 35:637-643 (2002)). Solubility of ethene in toluene solutions was determined using empirical equations.

As shown in Table 2, a higher ratio of co-catalyst A to co-catalyst B has a much lower ability to incorporate 1-hexene than a lower ratio of co-catalyst A to co-catalyst B. This is manifested in the much higher value of $r_e$ for a 1 to 7 ratio of co-catalyst A to co-catalyst B compared to the $r_e$ for a 1 to 1 ratio of co-catalyst A to co-catalyst B (434.5 to 58.3, respectively). Analysis of the copolymerization parameters (Table 2) reveals that the product of the reactivity ratios $r_e$*$r_h$ for runs 1 and 3 are higher than 1 ($r_e$*$r_h$=1.07 and 1.10, respectively), indicative of either a blocky distribution of comonomers or of a broad short chain branching distribution. The reactivity ratios of for runs 2 and 5 are lower than 1 ($r_e$*$r_h$=0.86 and 0.83, respectively) and indicative of a slightly alternating sequence distribution.

TABLE 2

$^{13}$C NMR characterization of ethene/1-hexene copolymers.

| run | 1 | 2 | 3 | 4 | 5 | 6 |
|---|---|---|---|---|---|---|
| co-catalyst A: co-catalyst B | 1:0 | 1:1 | 1:2 | 1:3 | 1:5 | 1:7 |
| [H]% | 17.0 | 15.9 | 11.5 | 8.5 | 6.4 | 2.5 |
| HH | 0.017 | 0.015 | 0.004 | 0.001 | 0.000 | 0.000 |
| HE | 0.305 | 0.287 | 0.221 | 0.167 | 0.128 | 0.049 |
| EE | 0.680 | 0.697 | 0.772 | 0.832 | 0.872 | 0.950 |
| HHH | 0.005 | 0.003 | 0.002 | 0.001 | 0.000 | 0.000 |
| HHE | 0.046 | 0.040 | 0.019 | 0.012 | 0.007 | 0.000 |
| EHE | 0.119 | 0.115 | 0.080 | 0.072 | 0.057 | 0.025 |
| HEH | 0.028 | 0.023 | 0.014 | 0.008 | 0.004 | 0.000 |
| EEH | 0.248 | 0.240 | 0.193 | 0.152 | 0.119 | 0.049 |
| EHE | 0.550 | 0.565 | 0.668 | 0.752 | 0.808 | 0.920 |
| $r_e$ | 54.6 | 58.3 | 98.1 | 122.1 | 165.7 | 434.5 |
| $r_h$ | 0.0196 | 0.0148 | 0.0112 | 0.0078 | 0.0050 | 0.0000 |
| $r_e$*$r_h$ | 1.07 | 0.86 | 1.10 | 0.95 | 0.83 | 0.00 |

Example 3

Kinetic Study of Copolymerization of Ethylene with 1-Hexene

In a 250 mL Schlenk flask, to 80 mL of toluene at 25° C. was added ZnEt$_2$ (1.65 mg, 50 equiv (based on the pre-catalyst)) as a 15% wt (1.1 M) solution in toluene and 1-hexene (10.1 g, 3000 equiv (based on the pre-catalyst)) and stirred for 30 minutes. A clear yellow mixture of co-catalyst [PhNHMe$_2$][B(C$_6$F$_5$)$_4$] (16.0 mg, 0.020 mmol), co-catalyst B(C$_6$F$_5$)$_3$ (10.2 mg, 0.020 mmol), and pre-catalyst ($\eta^5$-C$_5$Me$_5$)Hf(Me)$_2$[N(Et)C(Me)N(Et)] (18.3 mg, 0.040 mmol) in 1.5 mL chlorobenzene was added to the Schlenk flask which was pressurized to 5 psi with ethane to initiate polymerization. Aliquots (about 5 mL) were removed every 10 minutes for the first hour and quenched with methanol. All the aliquots were purified by precipitation into acidic methanol and dried in vacuo. Polymerization was quenched after 1.5 hours with methanol and precipitated into 800 mL of acidic methanol (10% concentrated HCl) to isolate the polymer. The final product was collected and dried overnight in vacuo. Yield: 7.1 g.

As is shown in Table 3, increasing the time of the reaction provided a maximum 1-hexene incorporation level between 20 and 30 minutes with a decrease in the 1-hexene incorporation level after 40 minutes. As shown in Table 4, increasing the temperature of the reaction to 90° C. produced a copolymer product that could not be analyzed by GPC analysis.

TABLE 3

Kinetic study.

| time (minutes) | Mn (kDa) | PDI | [H]% |
|---|---|---|---|
| 10 | 0.60 | 1.55 | 22.0 |
| 20 | 1.01 | 1.46 | 22.6 |
| 30 | 1.55 | 1.37 | 22.5 |
| 40 | 2.19 | 1.28 | 21.6 |
| 50 | 2.69 | 1.25 | 20.7 |
| 60 | 3.57 | 1.19 | 18.9 |
| 90 | 5.20 | 1.17 | 15.8 |

TABLE 4

Non-chain transfer results.

| run | co-catalyst A: co-catalyst B | $t_p$ (min) | yield (mg) | $M_n$ (KDa) | PDI | $T_m$ (° C.) | 1-hexene contents (mol %) |
|---|---|---|---|---|---|---|---|
| 1 | 1:1 | 3 | 60 | 35.4 | 1.06 | 10-40 | 13.4 |
| 2 | 1:1 | 5 | 100 | ns | ns | 90 | |

Having now fully described this invention, it will be understood by those of ordinary skill in the art that the same can be performed within a wide and equivalent range of conditions, formulations and other parameters without affecting the scope of the invention or any embodiment thereof. All patents, patent applications, and publications cited herein are fully incorporated by reference herein in their entirety.

What is claimed is:

1. A method of producing a polyolefin composition comprising:
   (a) contacting a metal alkyl and a first olefin monomer;
   (b) adding a pre-catalyst, a first co-catalyst, a second co-catalyst, and a second olefin monomer, wherein the first co-catalyst forms a stronger ion-pair with the pre-catalyst than the second co-catalyst; and
   (c) polymerizing by ternary living coordinative chain transfer said first and second monomers for a time sufficient to form said polyolefin.

2. The method of claim 1, wherein the metal alkyl is Zn(R$^8$)$_2$ and wherein R$^8$ is selected from the group consisting of ethyl, methyl, iso-butyl, n-hexyl, n-propyl, and t-butyl.

3. The method of claim 1, wherein the metal alkyl is ZnEt$_2$.

4. The method of claim 1, wherein the metal alkyl and the first olefin monomer are contacted at a temperature of about 10° C. to about 25° C.

5. The method of claim 1, wherein the first olefin monomer is ethene, propene, 1-butene, 1-pentene, 1-hexene, 1-heptene, 1-octene, styrene, butadiene, isoprene, 3-methylbutene, 3-methyl-1-pentene, vinylcyclohexane, vinylcyclobutane, vinylcyclopentane, vinylcyclooctane, 1-decene, enantiomerically pure β-citronellene, 3,5,5-trimethyl-1-hexene, cyclopentene, vinylcyclohexene, or 4-methyl-1-pentene.

6. The method of claim 1, wherein the first olefin monomer is ethene.

7. The method of claim 1, wherein the metallocene pre-catalyst is ($\eta^5$-C$_5$Me$_5$)Hf(Me)$_2$[N(Et)C(Me)N(Et)].

8. The method of claim 1, wherein the first co-catalyst is [PhNHMe$_2$][B(C$_6$F$_5$)$_4$].

9. The method of claim 1, wherein the second co-catalyst is [PhNMe$_2$H][B(C$_6$F$_5$)$_3$Me] or B(C$_6$F$_5$)$_3$.

10. The method of claim 1, wherein the second olefin monomer is ethene, propene, 1-butene, 1-pentene, 1-hexene, 1-heptene, 1-octene, styrene, butadiene, isoprene, 3-methylbutene, 3-methyl-1-pentene, vinylcyclohexane, vinylcyclobutane, vinylcyclopentane, vinylcyclooctane, 1-decene, enantiomerically pure β-citronellene, 3,5,5-trimethyl-1-hexene, cyclopentene, vinylcyclohexene or 4-methyl-1-pentene.

11. The method of claim 1, wherein the second olefin monomer is 1-hexene.

12. The method of claim 1, wherein the ratio of the first co-catalyst to the second co-catalyst is from about 0.1:1 to about 20:1.

13. The method of claim 1, wherein the ratio of the first co-catalyst to the second co-catalyst is from about 1:1 to about 1:7.

14. The method of claim 1, wherein the incorporation level of the first olefin monomer is about 1% to about 30%.

15. The method of claim 1, wherein the incorporation level of the first olefin monomer is about 2.5% to about 22.6%.

16. The method of claim 1, wherein the incorporation level of the first olefin monomer is about 2.5% to about 17%.

17. The method of claim 1, wherein the metal alkyl is ZnEt$_2$, the pre-catalyst is ($\eta^5$-C$_5$Me$_5$)Hf(Me)$_2$[N(Et)C(Me)N(Et)], the first co-catalyst is [PhNMe$_2$H][B(C$_6$F$_5$)$_3$Me], and the second co-catalyst is B(C$_6$F$_5$)$_3$.

18. The method of claim 17, wherein the first olefin monomer is ethene and the second olefin monomer is 1-hexene.

19. A method of controlling the level of incorporation of a first olefin monomer into a polyolefin composition comprising:
   (a) contacting a first olefin monomer and a metal alkyl;
   (b) adding a pre-catalyst, a first co-catalyst, a second co-catalyst, and a second olefin monomer, wherein the first co-catalyst forms a stronger ion-pair with the pre-catalyst than the second co-catalyst; and
   (c) polymerizing by ternary living coordinative chain transfer said first and second monomers for a time sufficient to form said polyolefin;
wherein increasing the amount of the second co-catalyst decreases the level of incorporation of the first olefin monomer.

* * * * *